United States Patent
Zhang et al.

(10) Patent No.: US 11,405,109 B2
(45) Date of Patent: Aug. 2, 2022

(54) INFORMATION TRANSMISSION METHOD, OPTICAL LINE TERMINATION, OPTICAL NETWORK UNIT, AND COMMUNICATIONS SYSTEM

(71) Applicant: HUAWEI TECHNOLOGIES CO., LTD., Guangdong (CN)

(72) Inventors: Lun Zhang, Dongguan (CN); Gang Zheng, Dongguan (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/186,751

(22) Filed: Feb. 26, 2021

(65) Prior Publication Data
US 2021/0184772 A1   Jun. 17, 2021

Related U.S. Application Data

(63) Continuation of application No. PCT/CN2018/103630, filed on Aug. 31, 2018.

(51) Int. Cl.
  *H04B 10/27* (2013.01)
  *H04B 10/25* (2013.01)
  *H04B 10/079* (2013.01)

(52) U.S. Cl.
  CPC ......... *H04B 10/27* (2013.01); *H04B 10/0795* (2013.01); *H04B 10/2589* (2020.05)

(58) Field of Classification Search
  CPC ............... H04B 10/27; H04B 10/0795; H04B 10/2589; H04J 14/0236; H04J 14/0252
  See application file for complete search history.

(56) References Cited

U.S. PATENT DOCUMENTS

| 10,756,841 | B2 * | 8/2020 | Lin ................... H04Q 11/0067 |
| 2012/0315040 | A1 * | 12/2012 | Dahlfort ............ H04J 14/0267 398/58 |
| 2016/0285555 | A1 | 9/2016 | Wu et al. |

(Continued)

FOREIGN PATENT DOCUMENTS

| CN | 1332532 A | 1/2002 |
| CN | 101047450 A | 10/2007 |

(Continued)

OTHER PUBLICATIONS

ZTE Corporation,"ONU activation in TWDM-PON systems",ITU-T Draft, Study Period 2013-2016, International Telecommunication Union, CH,vol. 2/15, Geneva, Feb. 28, 2013, 6 pages.

(Continued)

*Primary Examiner* — Dzung D Tran
(74) *Attorney, Agent, or Firm* — Fish & Richardson P.C.

(57) ABSTRACT

The present disclosure relates to information transmission methods, optical line terminations (OLTs), optical network units (ONUs), and communications systems. One example method on an OLT side includes allocating, by the OLT, an identifier to a first ONU through a first channel, performing, through the first channel, ranging on the first ONU to obtain ranging information about the first channel, and after determining, by the OLT and the ONU through negotiation, to use two channels to perform information transmission, performing, by the OLT, data transmission of a first service with the first ONU through a second channel.

20 Claims, 6 Drawing Sheets

(56) References Cited

U.S. PATENT DOCUMENTS

| | | | |
|---|---|---|---|
| 2017/0302433 A1 | 10/2017 | Powell | |
| 2018/0212705 A1* | 7/2018 | Gao | H04L 12/2898 |
| 2019/0356389 A1* | 11/2019 | Weeber | H04B 10/40 |

FOREIGN PATENT DOCUMENTS

| | | |
|---|---|---|
| CN | 103248418 A | 8/2013 |
| CN | 105610535 A | 5/2016 |
| CN | 106937184 A | 7/2017 |
| CN | 107371071 A | 11/2017 |
| CN | 108092709 A | 5/2018 |
| CN | 108156538 A | 6/2018 |
| EP | 3537628 A1 | 9/2019 |
| JP | 2013500646 A | 1/2013 |
| JP | 2016513412 A | 5/2016 |
| JP | 2018500844 A | 1/2018 |
| KR | 20160118873 A | 10/2016 |
| WO | 2018094606 A1 | 5/2018 |

OTHER PUBLICATIONS

ITU-T G.984.3, Series G: Transmission Systems and Media, Digital Systems and Networks, Digital sections and digital line system Optical line systems for local and access networks, Gigabit-capable passive optical networks (G-PON): Transmission convergence layer specification, Jan. 2014, 170 pages.

Geng et al., "Channel capability report during registration for IOOG-EPON", IEEE Draft, Zhang Junwen 3CA 2 1117, IEEE-SA, Piscataway, 802.3ca,31, New Jersey, USA, Oct. 31, 2017, 13 pages.

Extended European Search Report issued in European Application No. 18931644.1, dated Jul. 29, 2021, 12 pages.

Office Action issued in Chinese Application No. 201880095792.1, dated Jul. 9, 2021, 25 pages (With English Translation).

PCT International Search Report and Written Opinion in International Application. No. PCT/CN2018/103630, dated May 31, 2019, 13 pages (With English Translation).

Office Action issued in Korean Application No. 2021-7008794 dated Apr. 30, 2022, 5 pages (with English translation).

Office Action issued in Japanese Application No. 2021-510800 dated May 10, 2022, 9 pages (with English translation).

Office Action issued in Chinese Application No. 201880095792.1 dated Jun. 10, 2022, 9 pages.

Zhongbo et al., "Improvement of Optical Fiber Ranging and Time Synchronization Scheme in Passive Optical Networks" Explore and Observe, May 2013, 9 pages (with English translation).

\* cited by examiner

INFORMATION TRANSMISSION METHOD, OPTICAL LINE TERMINATION, OPTICAL NETWORK UNIT, AND COMMUNICATIONS SYSTEM

CROSS-REFERENCE TO RELATED APPLICATIONS

This application is a continuation of International Application No. PCT/CN2018/103630, filed on Aug. 31, 2018, the disclosure of Which is hereby incorporated by reference in its entirety.

TECHNICAL FIELD

Embodiments of this application relate to communications technologies, and in particular, to an information transmission method, an optical line termination, an optical network unit, and a communications system.

BACKGROUND

A passive optical network (PON) is a one-fiber bidirectional optical access network that uses a point-to-multipoint structure. A PON system mainly includes an optical line termination (OLT), an optical network unit (ONU), and an optical distribution network (ODN). The OLT is a central office device, the ONU is a user-side device, and the ODN provides an optical channel between the OLT and the ONU. The OLT can be connected to a front-end switch, to convert a digital signal of the front-end switch into an optical signal. The OLT can perform control, management, ranging, and the like on the ONU. The ONU can receive, in a downstream direction, broadcast data sent by the OLT, and send, in an upstream direction, user-side data to the ONU. A plurality of ONUs connected to one OLT perform upstream services at different time points in the upstream direction. Before performing the upstream service to the OLT, the ONU needs to register with the OLT and establish a controllable connection to the OLT.

In the prior art, the OLT reserves a time period every specific period. In the time period, an ONU that has been online is not allowed to perform the upstream service, and only an ONU that is not online is allowed to send a serial number (SN) or send ranging information, to perform registration.

However, a method in the prior art may increase an upstream service delay of the ONU that has been online.

SUMMARY

Embodiments of this application provide an information transmission method, an optical line termination, an optical network unit, and a communications system, to resolve a prior-art problem that an upstream service delay of an ONU increases because an upstream service is not allowed in a specific time period.

A first aspect of the embodiments of this application provides an information transmission method. The method is applied to an OLT, and the method includes:

The OLT allocates an identifier to a first ONU through a first channel, and performs, through the first channel, ranging on the first ONU to obtain ranging information about the first channel; and after the OLT and the first ONU determine, through negotiation, to use two channels to perform information transmission, the OLT performs data transmission of a first service with the first ONU through a second channel.

In this method, identifier allocation and ranging are performed through the first channel, and the data transmission of the first service is performed through the second channel. In this way, a relatively large delay is no longer generated for service data that has a relatively high requirement for delay. This further ensures normal execution of these services.

In a possible design, before that the OLT performs data transmission of a first service with the first ONU through a second channel, the method further includes:

The OLT and the first ONU determine, through negotiation, whether to use the two channels to perform the information transmission.

In a possible design, that the OLT and the first ONU determine, through negotiation, whether to use the two channels to perform the information transmission includes:

The OLT receives dual-channel support capability information sent by the first ONU, where the dual-channel support capability information includes a type of the first channel and a type of the second channel that are supported by the first ONU; and the OLT determines, based on the dual-channel support capability information sent by the first ONU and a dual-channel support capability of the OLT, whether to use the two channels to perform the information transmission.

In a possible design, after that the OLT and the first ONU determine, through negotiation, to use two channels to perform information transmission, the method further includes:

The OLT sends dual-channel configuration information to the first ONU. The dual-channel configuration information includes a type of the first channel and a type of the second channel that are selected by the OLT.

In a possible design, before that the OLT performs data transmission of a first service with the first ONU through a second channel, the method further includes:

The OLT determines ranging information about the second channel based on the ranging information about the first channel and a channel path delay difference.

The channel path delay difference includes at least one of a difference value between OLT circuit transmission delays, a difference value between ONU circuit transmission delays, and a difference value between optical path transmission delays caused by different wavelengths.

In a possible design, that the OLT performs data transmission of a first service with the first ONU through a second channel includes:

The OLT performs the data transmission of the first service with the first ONU through the second channel based on the ranging information about the second channel and the identifier allocated to the first ONU.

In a possible design, the OLT performs data transmission of a second service with the first ONU through the first channel or the second channel.

In a possible design, a delay of the first service is less than a preset delay, and a delay of the second service is greater than or equal to the preset delay.

In a possible design, a transmission delay supported by the first channel is greater than a transmission delay supported by the second channel.

In a possible design, the method further includes:

The OLT performs authentication management and transmission configuration on the first ONU through the first channel or the second channel.

A second aspect of the embodiments of this application provides an information transmission method. The method is applied to an ONU, and the method includes:

The ONU obtains an identifier through a first channel, and performs, through the first channel, ranging to obtain ranging information about the first channel and after the ONU and an OLT determine, through negotiation, to use two channels to perform information transmission, the ONU performs data transmission of a first service with the OLT through a second channel.

In this method, identifier obtaining and ranging are performed through the first channel, and the data transmission of the first service is performed through the second channel. In this way, a relatively large delay is no longer generated for service data having a relatively high requirement for delay. This further ensures normal execution of these services.

In a possible design, before that the ONU performs data transmission of a first service with the OLT through a second channel, the method further includes:

The ONU and the OLT determine, through negotiation, whether to use the two channels to perform the information transmission.

In a possible design, that the ONU and the OLT determine, through negotiation, whether to use the two channels to perform the information transmission includes:

The ONU sends dual-channel support capability information to the OLT, where the dual-channel support capability information includes a type of the first channel and a type of the second channel that are supported by the ONU; and the ONU receives dual-channel configuration information sent by the OLT. The dual-channel configuration information includes a type of the first channel and a type of the second channel that are selected by the OLT.

In a possible design, before that the ONU performs data transmission of a first service with the OLT through a second channel, the method further includes:

The ONU determines ranging information about the second channel based on the ranging information about the first channel and a channel path delay difference.

The channel path delay difference includes at least one of a difference value between OLT circuit transmission delays, a difference value between ONU circuit transmission delays, and a difference value between optical path transmission delays caused by different wavelengths.

In a possible design, that the ONU performs data transmission of a first service with the OLT through a second channel includes:

The ONU performs the data transmission of the first service with the OLT through the second channel based on the ranging information about the second channel and the obtained identifier.

In a possible design, the method further includes:

The ONU performs data transmission of a second service with the OLT through the first channel or the second channel.

In a possible design, a delay of the first service is less than a preset delay, and a delay of the second service is greater than or equal to the preset delay.

In a possible design, a transmission delay supported by the first channel is greater than a transmission delay supported by the second channel.

A third aspect of the embodiments of this application provides an information transmission apparatus. The apparatus may be an OLT, or may be an apparatus that can support the OLT in performing a corresponding function performed by the OLT in the first aspect. The apparatus may be an apparatus in the OLT or a chip system, and the apparatus may include a processing module and a receiving module. These modules may perform corresponding functions performed by the OLT in the first aspect. For example, the processing module is configured to: allocate an identifier to a first ONU through a first channel, and perform, through the first channel, ranging on the first ONU to obtain ranging information about the first channel; and the receiving module is configured to: after the OLT and the first ONU determine, through negotiation, to use two channels to perform information transmission, perform data transmission of a first service with the first ONU through a second channel.

A fourth aspect of the embodiments of this application provides an information transmission apparatus. The apparatus may be an ONU, or may be an apparatus that can support the ONU in performing a corresponding function performed by the ONU in the second aspect. The apparatus may be an apparatus in the ONU or a chip system, and the apparatus tray include a processing module and a sending module. These modules may perform corresponding functions performed by the OLT in the second aspect. For example, the processing module is configured to: obtain an identifier through a first channel, and perform, through the first channel, ranging to obtain ranging information about the first channel; and the sending module is configured to: after the ONU and the OLT determine, through negotiation, to use two channels to perform information transmission, perform data transmission of a first service with the OLT through a second channel.

A fifth aspect of the embodiments of this application provides an OLT. The OLT includes a processor, configured to implement functions of the OLT in the method described in the first aspect. The OLT may further include a memory, configured to store a program instruction and data. The memory is coupled to the processor. The processor may invoke and execute the program instruction stored in the memory, to implement the functions of the OLT in the method described in the first aspect. The OLT may further include a communications interface. The communications interface is used by the OLT to communicate with another device. For example, the another device is an ONU.

In a possible design, the OLT includes
the communications interface;
the memory, configured to store the program instruction; and
the processor, configured to implement the method according to the first aspect.

A sixth aspect of the embodiments of this application provides an ONU. The ONU includes a processor, configured to implement functions of the ONU in the method described in the second aspect. The ONU may further include a memory, configured to store a program instruction and data. The memory is coupled to the processor. The processor may invoke and execute the program instruction stored in the memory, to implement the functions of the ONU in the method described in the second aspect. The ONU may further include a communications interface. The communications interface is used by the ONU to communicate with another device. For example, the another device is an OLT In a possible design, the ONU includes
the communications interface;
the memory, configured to store the program instruction; and
the processor, configured to implement the method according to the second aspect.

A seventh aspect of the embodiments of this application provides a communications system. The system includes the OLT according to the fifth aspect and the ONU according to the sixth aspect.

An eighth aspect of the embodiments of this application provides a computer program product. The computer program product includes computer program code, and when the computer program code is executed by a computer, the computer is enabled to perform the method according to the first aspect or the second aspect.

A ninth aspect of the embodiments of this application provides a computer-readable storage medium. The computer storage medium stores a computer instruction, and when the computer instruction is executed by a computer, the computer is enabled to perform the method according to the first aspect or the second aspect.

DESCRIPTION OF EMBODIMENTS

A PON is a one-fiber bidirectional optical access network that uses a point-to-multipoint structure. Compared with a network with a structure such as a traditional point-to-point and fiber to the curb switch, the PON has advantages of reducing transmission costs and avoiding an increase of access-side fault points. Therefore, the PON is considered as a development direction of an access network.

Figure 1:
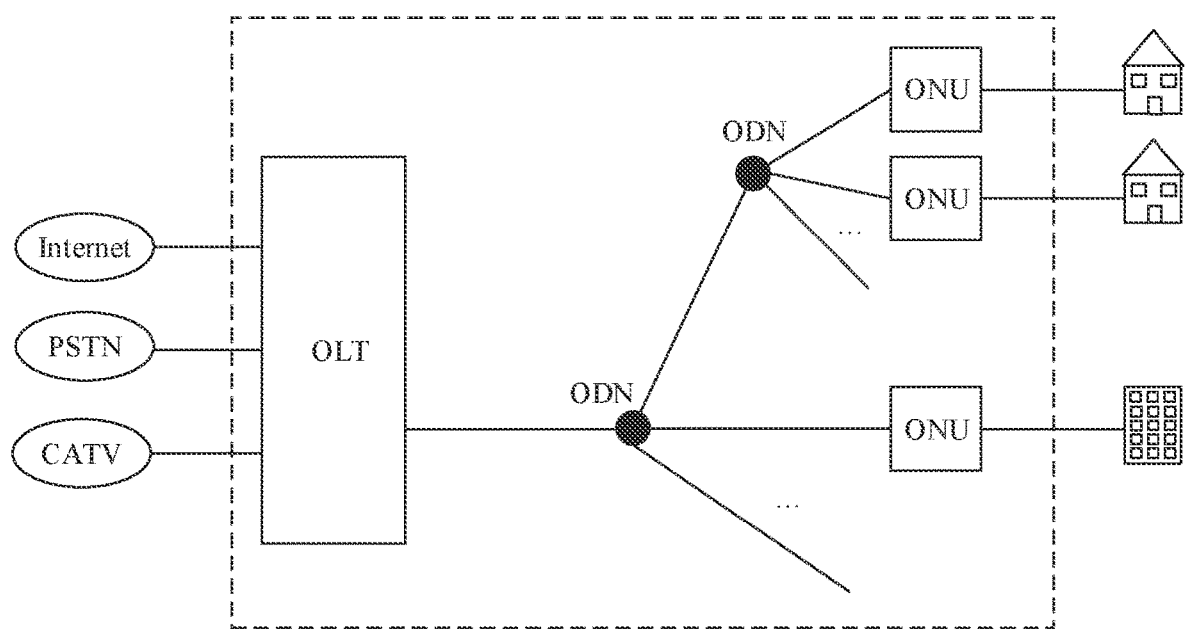
FIG. 1 is a schematic diagram of a network architecture of a PON.

FIG. 1 is a schematic diagram of a network architecture of a PON. As shown in FIG. 1, a PON system mainly includes an OLT, an ONU, and an ODN. The OLT is a central office device, the ONU is a user-side device, and the ODN provides an optical channel between the OLT and the ONU. The OLT may be connected to various front-end networks, such as the internet, a public switched telephone network (PSTN), a community antenna television (CATV) system, a streaming media network, and a monitoring network. The OLT converts a digital signal of the front-end network into an optical signal, and transmits the optical signal to the ONU through the ODN. The ODN is an optical transmission medium between the OLT and the ONU and may complete power allocation of the optical signal. The ONU receives service data broadcast by the OLT in a downstream direction, and sends user-side service data to the ONU in an upstream direction.

Figure 2:
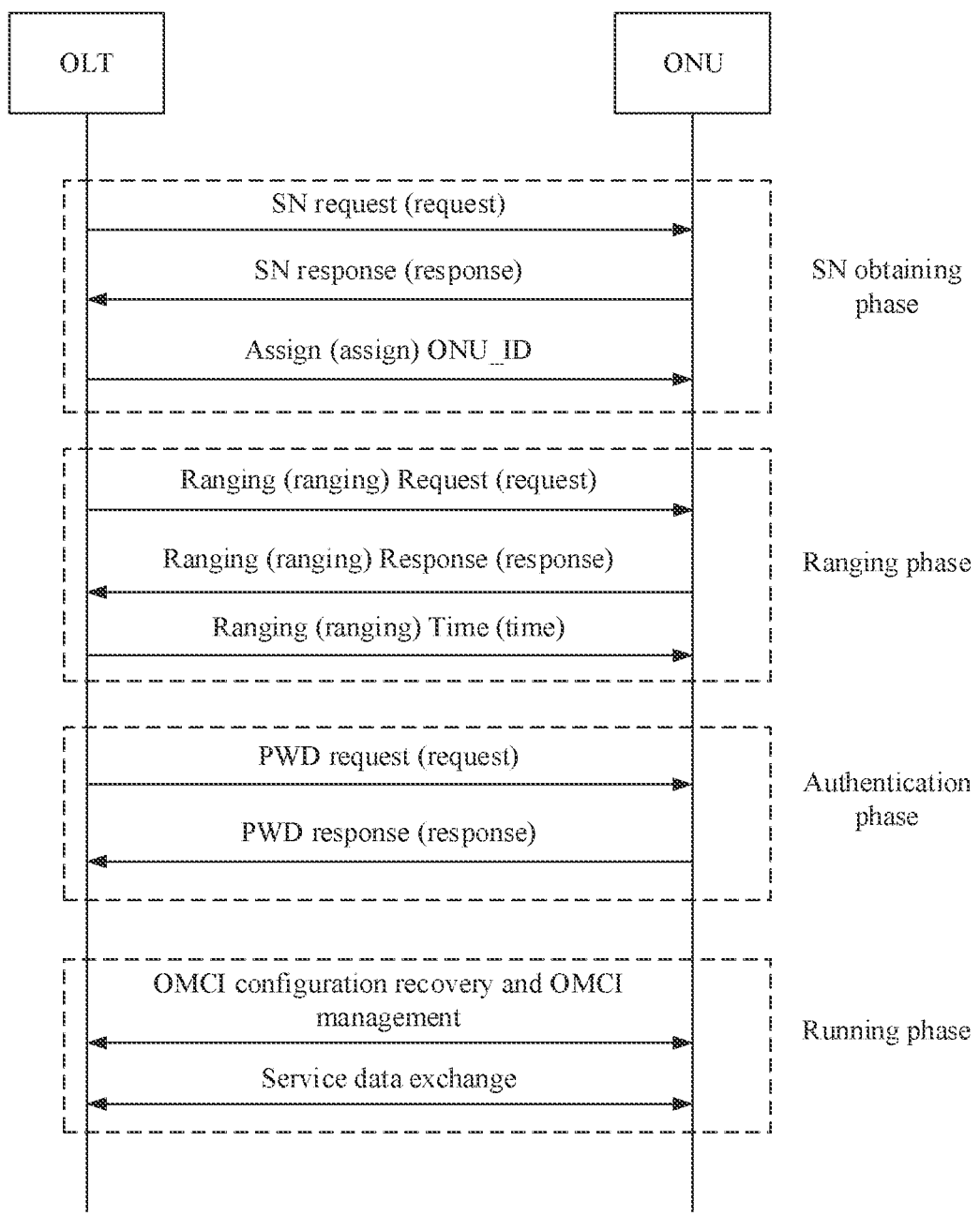
FIG. 2 is a schematic flowchart of ONU registration.

Before performing service data exchange with the OLT, the ONU may first register with the OLT. Optionally, an ONU registration process may be divided into an SN obtaining phase, a ranging phase, an authentication phase, and a running phase. FIG. 2 is a schematic flowchart of ONU registration. As shown in FIG. 2, in an SN obtaining phase, an OLT obtains an SN of an ONU by broadcasting an SN request message. After receiving the SN request message, a to-be-registered ONU may feed back an SN response message to the OLT, and add the SN of the ONU in the message. The OLT allocates a corresponding ONU ID to each obtained SN based on feedback of the ONU, and sends the allocated ONU ID to the ONU through an Assign ONU_ID message. The ONU ID and the SN are in a one-to-one correspondence. The ONU ID may be used to distinguish between different ONUs when the OLT and the ONU perform message exchange, and may be displayed on an ONU side. In a ranging phase, the OLT sends a ranging request message to the ONU. After receiving the message, the ONU feeds back a ranging response message to the OLT. The OLT performs ONU ranging based on an interval between a time point at which the ranging request message is sent and a time point at which the ranging response message is received, and sends ranging information to the ONU through a ranging time message. In an authentication phase, the OLT mainly performs authentication management. An authentication management manner may be SN authentication, password authentication, or the like. In FIG. 2, the password authentication is used as an example. The OLT sends a PWD request message to the ONU. The ONU feeds back a PWD response message to the OLT, and adds password information in the message. After the authentication phase ends, the OLT may determine that a specific ONU has been online, and then a running phase is entered. In the running phase, the OLT performs ONU management and control interface (OMCI) configuration recovery and OMCI management, such as encryption and service flow creation. After these management and control processes are completed, the service data exchange is performed between the ONU and the OLT.

In a possible design, a plurality of ONUs connected to the OLT send upstream service data to the OLT in a time-division multiplexing mode. However, before the foregoing authentication phase is completed, namely, before the OLT determines that the ONU has been online, the ONU does not have a specific TCONT resource to perform information transfer. Therefore, in a possible design, the OLT may reserve a time period every specific period. In the time period, the ONU that has been online is not allowed to perform an upstream service, and only an ONU that is not online is allowed to send the SN or send the ranging information, to perform registration. In this case, the SN obtaining phase shown in FIG. 2 may be referred to as an "SN window", and the ranging phase shown in FIG. 2 may be referred to a "ranging window".

Durations of the "SN window" and the "ranging window" may be the same or may be different. The "SN window" is used as an example. It is assumed that the duration of the "SN window" is two frames, namely, 250 microseconds. In the 250 microseconds, the OLT allows only the ONU that is not online to send the SN, and does not allow another ONU that has been online to send the upstream service data. To be specific, for the another ONU that has been online, a maximum service delay may exceed the 250 microseconds.

For services such as a conventional common internet access service and a 4K video service, a delay requirement is usually less than 20 milliseconds. Therefore, a delay of the 250 microseconds does not affect these services. However, for some new services such as virtual reality (VR) cloud gaming and VR telemedicine, a relatively high requirement is imposed on delay, and a delay allocated to an access network may be only 150 microseconds. Therefore, if the foregoing method is used, delay requirements of these services cannot be met, and these services may be abnormal.

Technical solutions described in this application are intended to resolve the foregoing problem.

Figure 3:
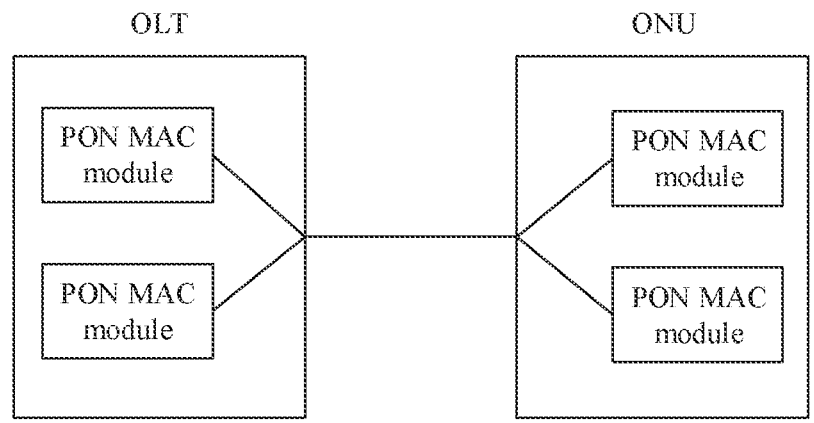
FIG. 3 is a system architectural diagram of an information transmission method according to this application.

FIG. 3 is a system architectural diagram of an information transmission method according to this application. As shown in FIG. 3, the method relates to an OLT and an ONU.

On an OLT side, two PON media access control (MAC) modules are included. An optical module of the OLT supports demultiplexing of two wavelengths. After demultiplexing optical signals of the two wavelengths, the optical module converts the optical signals into electrical signals, and sends the electrical signals to the two PON MAC modules respectively. The two PON MAC modules respectively perform framing and parsing processing on two types of electrical signals, to support two transmission channels of different rates. For example, a first PON MAC module implements a gigabit-capable PON (GPON) channel, and a second PON MAC module implements a 10G GPON (XG-PON) channel.

Correspondingly, on an ONU side, two PON MAC modules are also included. The two PON MAC modules respectively perform framing and parsing processing on two types of electrical signals, to support two transmission channels of different rates. The rates of the two transmission channels are respectively the same as the rates of the two transmission channels on the OLT side. For example, a first PON MAC module of the ONU implements the GPON channel, and a rate of the GPON channel is the same as a rate of a first channel of the OLT. A second PON MAC module of the ONU implements the XG-PON channel, and a rate of the XG-PON channel is the same as a rate of a second channel of the OLT.

Figure 4:
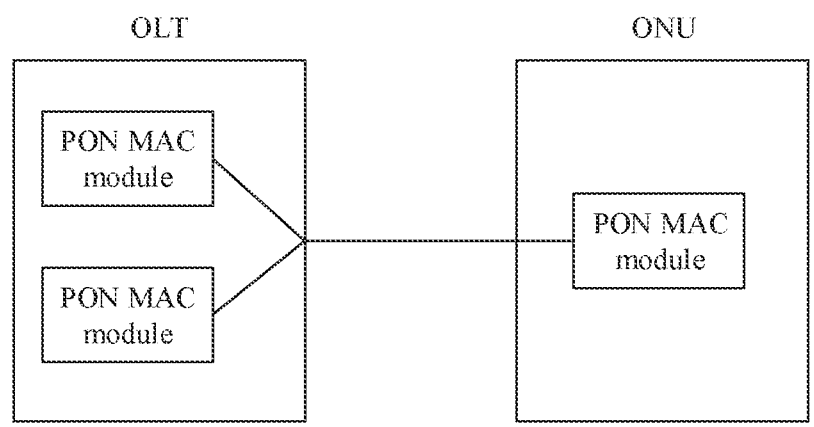
FIG. 4 is another system architectural diagram of an information transmission method according to this application.

FIG. 4 is another system architectural diagram of an information transmission method, according to this application. As shown in FIG. 4, the method relates to an OLT and an ONU.

On an OLT side, two PON MAC modules are included. The two PON MAC modules respectively perform framing and parsing processing on two types of electrical signals, to implement two transmission channels of different rates. For example, a first PON MAC module implements a GPON channel, and a second PON MAC module implements a XG-PON channel.

On an ONU side, one PON MAC module is included. The one PON MAC module supports a transmission channel of different rates in different time periods. For example, the one PON MAC module implements the GPON channel in an SN obtaining phase and a ranging phase, and implements the XG-PON channel in an upstream service process and another phase of a registration process.

It should be noted that, for ease of describing the technical solutions of this application, the foregoing system architectural diagrams shown in FIG. 3 and FIG. 4 show only architectures between the OLT and the ONU. However, an ODN is still used as an optical transmission medium between the OLT and the ONU. For a specific connection and implementation method of the ODN, refer to the description corresponding to FIG. 1. Details are not described herein again.

For ease of description, in this application, the two channels implemented by the OLT and the ONU are respectively referred to as a first channel and a second channel. A transmission delay of the first channel is greater than a transmission delay the second channel. To be specific, the first channel is a high-delay channel, and the second channel is a low-delay channel.

Figure 5:
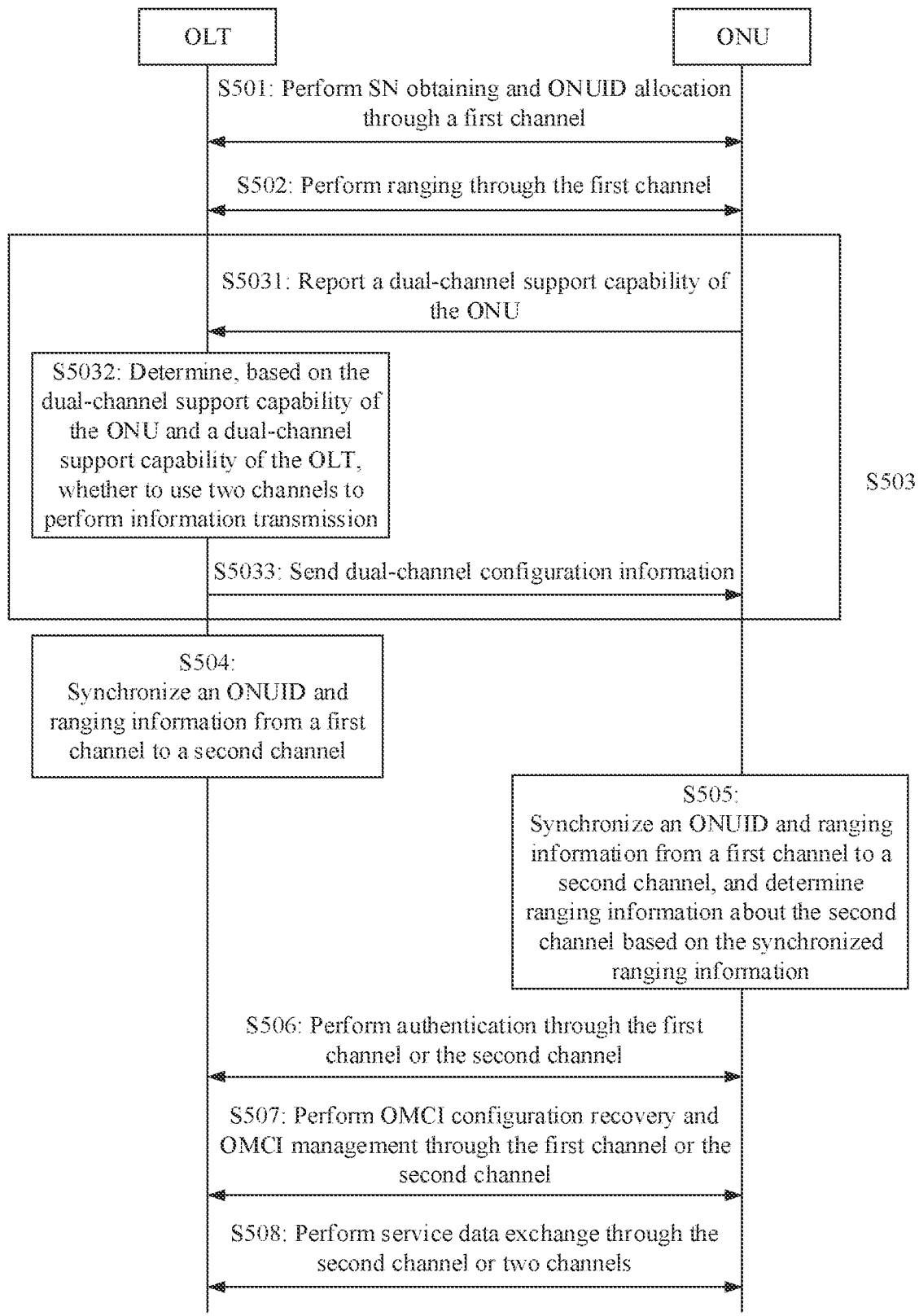
FIG. 5 is an interaction flowchart of an information transmission method according to this application.

FIG. 5 is an interaction flowchart of an information transmission method according to this application. As shown in FIG. 5, an interaction process of the method is as follows.

S501: An OLT and an ONU perform SN obtaining and ONU ID allocation through a first channel.

Optionally, a specific execution process of this step is an execution process of the SN obtaining phase in the foregoing description corresponding to FIG. 2. To be specific, in this application, the OLT broadcasts an SN request message through the first channel and sends an Assign ONU_ID message to the ONU, and the ONU feeds back an SN response message to the OLT through the first channel.

S502: The OLT and the ONU perform ranging through the first channel.

Optionally, a specific execution process of this step is an execution process of the ranging phase in the foregoing description corresponding to FIG. 2. To be specific, in this application, the OLT sends a ranging request message and a ranging time message to the ONU through the first channel, and the ONU feeds back a ranging response message to the OLT through the first channel.

S503: The OLT and the ONU determine, through negotiation, whether to use two channels to perform information transmission.

Optionally, the OLT and the ONU may perform the negotiation by using the following procedures.

S5031: The ONU reports a dual-channel support capability of the ONU to the OLT.

Optionally, the ONU may report the dual-channel support capability of the ONU through an extended physical layer operation, administration and maintenance (PLOAM) message.

For example, the foregoing extended PLOAM message may be an Ext_dual_channel_ONU_Ability message, and a structure of the message may be shown in the following Table 1.

TABLE 1

| Byte | Parameter | Description |
|---|---|---|
| 1 | ONU ID | The parameter is used to identify an ONU that sends an Ext_dual_channel_ONU_Ability message |
| 2 | 250 | The parameter is used to identify that a message is an Ext_dual_channel_ONU_Ability message |
| 3 | Dual-channel support capability | The parameter is used to identify whether the ONU supports two channels: If the ONU supports the two channels, a value of the parameter is 1; and if the ONU does not support the two channels, the value of the parameter is 0 |
| 4 | Type of a first channel | The parameter identifies a type of the first channel, and is valid only when a value of the foregoing parameter "dual-channel support capability" is set to 1; and the type of the first channel may include: a GPOX, a XG-PON, a XGS-PON, a TWDM-PON, an EPON, and a 10G EPON |

TABLE 1-continued

| Byte | Parameter | Description |
|---|---|---|
| 5 | Type of a second channel | The parameter indicates a type of the second channel, and is valid only when a value of the foregoing parameter "dual-channel support capability" is set to 1; and the type of the second channel may include: a GPON, a XG-PON, a XGS-PON, a TWDM-PON, an EPON, and a 10G EPON |
| 6-10 | ΔEQD_onu | Byte 6 is a positive/negative adjustment indication; and The seventh to tenth bytes are difference values between circuit transmission delays of a first channel and a second channel of an ONU |
| 11-12 | Reserved | |

The XGS-PON is a 10G GPON. The XGS-PON is in a symmetric mode (a downstream rate is the same as an upstream rate). The XG-PON is in an asymmetric mode (the downstream rate is different from the upstream rate). The TWDM-PON is a time and wavelength division multiplexing PON. The EPON is an Ethernet passive optical network (ethernet PON).

As shown in the foregoing Table 1, the ONE identifies the dual-channel support capability of the ONU by using the third, fourth, and fifth bytes in the Ext_dual_channel_ONU_Ability message.

S5032: The OLT determines, based on the dual-channel support capability of the ONU and a dual-channel support capability of the OLT, whether to use the two channels to perform the information transmission.

Optionally, if the ONU supports the two channels, a type of the first channel supported by the ONU matches a type of the first channel supported by the OLT; and a type of the second channel supported by the ONU matches a type of a second channel supported by the OLT, the OLT may determine to use the two channels to perform the information transmission. At the same time, the OLT determines the type of the first channel and the type of the second channel, and then the OLT sends dual-channel configuration information to the ONU by using the following process in S5033.

For example, if the type of the first channel supported by the ONU includes the GPON and the XG-PON, and if the type of the first channel supported by the OLT is at least one of the GPON and the XG-PON, it may be determined that the type of the first channel supported by the ONU matches the type of the first channel supported by the OLT.

A type matching manner of the second channel may also be performed with reference to the foregoing manner, and details are not described again.

Optionally, if the OLT does not receive the Ext_dual_channel_ONU_Ability message reported by the ONE, the type of the first channel supported by the ONU does not match the type of the first channel supported by the OLT; or the type of the second channel supported by the ONU does not match the type of the second channel supported by the OLT, the OLT determines not to use the two channels for transmission. In this case, the OLT and the ONU still perform the information transmission on a single channel in an existing manner.

S5033: The OLT sends the dual-channel configuration information to the ONU.

Optionally, the dual-channel configuration information is used to identify specific types of the first channel and the second channel and whether the OLT uses the two channels to perform the information transmission.

Optionally, the OLT may send the dual-channel configuration information to the ONU through the extended PLOAM message.

For example, the foregoing extended PLOAM message may be an Ext_dual_channel_config message, and a structure of the message may be shown in the following Table 2.

TABLE 2

| Byte | Parameter | Description |
|---|---|---|
| 1 | ONU ID | The parameter is used to identify an ONU that receives an Ext_dual_channel_config message |
| 2 | 250 | The parameter is used to identify that a message is an Ext_dual_channel_config message |
| 3 | Use of two channels | The parameter is used to identify whether the two channels are used: If the two channels are used, a value of the parameter is 1; and if the two channels are not used, the value of the parameter is 0 |
| 4 | Type of a first channel | The parameter indicates the type of the first channel, and is valid only when a value of the foregoing parameter "dual-channel support capability" is set to 1; and the type of the first channel may include: a GPON, a XG-PON, a XGS-PON, a TWDM-PON, an EPON, and a 10G EPON |
| 5 | Type of a second channel | The parameter indicates the type of the second channel, and is valid only when a value of the foregoing parameter "dual-channel support capability" is set to 1; and the type of the second channel may include: a GPON, a XG-PON, a XGS-PON, a TWDM-PON, an EPON, and a 10G EPON |
| 6-10 | ΔEQD_olt | Byte 6 is a positive/negative adjustment indication; and The seventh to tenth bytes are difference values between circuit transmission delays of a first channel and a second channel of an OLT |
| 11-12 | Reserved | |

As shown in the foregoing Table 2, the ONU identifies, by using third, fourth, and fifth bytes in the Ext_dual_channel_config message, the types of the first channel and the second channel and whether the two channels are used.

In another example, the Ext_dual_channel_config message may alternatively not include the parameter corresponding to the third byte. Specifically, if determining to use the two channels to perform the information transmission, the OLT sends an Ext_dual_channel_config message that includes a first channel type and a second channel type. If determining not to use the two channels to perform the information transmission, the OLT does not send the Ext_dual_channel_config message. Therefore, provided that the ONU receives the Ext_dual_channel_config message, the ONU may determine to use the two channels, and then the ONU learns the type of the first channel and the type of the second channel based on the first channel type and the second channel type that are included in the Ext_dual_channel_config message.

After that, if the two channels are used, the OLT and the ONU continue to perform interaction of an authentication phase and interaction of a running phase by using the process of the following embodiment. If the two channels are not used, the OLT and the ONU still perform the information transmission on the single channel in the existing manner, and no longer perform the following steps. A specific execution process is not described in this embodiment of this application.

S504: The OLT synchronizes an ONU ID and ranging information from a first channel to a second channel.

Optionally, as described in the foregoing descriptions corresponding to FIG. 3 and FIG. 4, the OLT includes two PON MAC modules. The two PON MAC modules respectively, implement the first channel and the second channel. It can be learned from the foregoing steps that the OLT and the ONU perform SN obtaining, ONU ID allocation, and ranging through the first channel. Therefore, a first PON MAC module configured to implement the first channel may learn the ONU ID and the ranging information, and a second PON MAC module configured to implement the second channel does not know the ONU ID and the ranging information. Therefore, in this step, the OLT synchronizes the ONU ID and the ranging information from the first channel to the second channel. Specifically, the first PON MAC module may directly send the ONU ID and the ranging information to the second PON MAC module. Alternatively, the second PON MAC module may send a request to the first PON MAC module, and then the first PON MAC module sends the ONU ID and the ranging information to the second PON MAC module. This is not limited in this application.

After the second channel of the OLT obtains the ONU ID, a correct ONU ID can be added in a downstream message, and an ONU that sends the message is recognized based on the ONU ID.

After the second channel of the OLT obtains the ranging information, ranging information corresponding to the second channel may be calculated according to the following formula (1).

$$EQD\_xgs1 = EQD\_g1 + \Delta EQD1 \quad (1)$$

EQD_xgs1 is the ranging information about the second channel; EQD_g1 is the ranging information about the first channel; and $\Delta EQD1$ is used to identify a delay difference between a path from an optical module of the OLT to the first channel and a path from the optical module of the OLT to the second channel. Optionally, $\Delta EQD1$ may include one or more of $\Delta EQD\_olt$, $\Delta EQD\_onu$, and $\Delta EQD\_fibre$. $\Delta EQD\_olt$ is a difference value between OLT circuit transmission delays. $\Delta EQD\_onu$ is a difference value between ONU circuit transmission delays. Optionally, a value of $\Delta EQD\_onu$ may be reported by the ONU to the OLT by using the bytes 7 to 10 in the Ext_dual_channel_ONU_Ability message shown in Table 1, $\Delta EQD\_fibre$ is a difference value between optical path transmission delays caused by different wavelengths.

Optionally, if $\Delta EQD1$ includes one of $\Delta EQD\_olt$, $\Delta EQD\_onu$, and $\Delta EQD\_fibre$, a value of $\Delta EQD1$ is equal to a value of the one of $\Delta EQD\_olt$, $\Delta EQD\_onu$, and $\Delta EQD\_fibre$.

For example, it is assumed that $\Delta EQD1$ includes $\Delta EQD\_olt$, the value of $\Delta EQD1$ is equal to the value of $\Delta EQD\_olt$. Correspondingly, the foregoing formula (1) may be represented as:

$$EQD\_xgs1 = EQD\_g1 + \Delta EQD\_olt.$$

Optionally, if $\Delta EQD1$ includes more than one of $\Delta EQD\_olt$, $\Delta EQD\_onu$, and $\Delta EQD\_fibre$, the value of $\Delta EQD1$ is equal to a sum of values of the more than one of $\Delta EQD\_olt$, $\Delta EQD\_onu$, and $\Delta EQD\_fibre$.

For example, it is assumed that $\Delta EQD1$ includes $\Delta EQD\_olt$ and $\Delta EQD\_onu$, the foregoing formula (1) may be represented as:

$$EQD\_xgs1 = EQD\_g1 + \Delta EQD\_olt + \Delta EQD\_onu.$$

In another example, it is assumed that $\Delta EQD1$ includes $\Delta EQD\_olt$, $\Delta EQD\_onu$, and $\Delta EQD\_fibre$, the foregoing formula (1) may be represented as:

$$EQD\_xgs1 = EQD\_g1 + \Delta EQD\_olt + \Delta EQD\_onu + \Delta EQD\_fibre.$$

Further, after obtaining the ranging information corresponding to the second channel, the OLT performs data transmission of a service with the ONU based on the ranging information and the foregoing obtained ONU ID.

S505: The ONU synchronizes an ONU ID and ranging information from a first channel to a second channel, and determines ranging information about the second channel based on the synchronized ranging information.

It should be noted that, if an internal structure of the ONU is the structure shown in FIG. 3, namely, the ONU includes two PON MAC modules, information synchronization may be performed according to the method in this step. If the internal structure of the ONU is the structure shown in FIG. 4, namely, the ONU includes one PON MAC module, the ONU does not need to perform this step. When the one PON MAC module is used to implement the second channel, the obtained ONU ID and ranging information may be directly used.

Optionally, it is assumed that the two PON MAC modules on the ONU are respectively a first PON MAC module and a second PON MAC module, where the first PON MAC module is configured to implement the first channel, and the second PON MAC module is configured to implement the second channel. When the ONU synchronizes the ONU ID and the ranging information from the first channel to the second channel, the first PON MAC module may directly send the ONU ID and the ranging information to the PON MAC module; or the second PON MAC module may send a request to the first PON MAC module, and then the first PON MAC module sends the ONU ID and the ranging information to the second PON MAC module. This is not limited in this application.

Optionally, for the ONU ID, after the second channel of the ONU obtains the ONU ID, a downstream broadcast message of the OLT can be filtered based on the ONU ID, and a correct ONU ID is added to an upstream message.

Optionally, for the ranging information, after the second channel of the ONU obtains the ranging information, the ranging information corresponding to the second channel may be calculated according to the foregoing formula (2).

$$EQD\_xgs2 = EQD\_g2 + \Delta EQD2 \quad (2)$$

EQD_xgs2 is the ranging information about the second channel. EQD_g2 is the ranging information about the first channel. $\Delta EQD2$ is used to identify a delay difference between a path from an optical module of an ONT to the first channel and a path from the optical module of the ONT to the second channel. Optionally, $\Delta EQD2$ may include one or more of $\Delta EQD\_olt$, $\Delta EQD\_onu$, and $\Delta EQD\_fibre$. $\Delta EQD\_olt$ is a difference value between OLT circuit transmission delays. Optionally, a value of $\Delta EQD\_olt$ may be sent by the OLT to the ONU by using the bytes 7-10 in the Ext_dual_channel_config message shown in Table 2. $\Delta EQD\_onu$ is a difference value between ONU circuit transmission delays. $\Delta EQD\_fibre$ is a difference value between optical path transmission delays caused by different wavelengths.

Optionally, if $\Delta EQD2$ includes one of $\Delta EQD\_olt$, $\Delta EQD\_onu$, and $\Delta EQD\_fibre$, a value of $\Delta EQD2$ is equal to a value of the one of $\Delta EQD\_olt$, $\Delta EQD\_onu$, and $\Delta EQD\_fibre$.

For example, it is assumed that ΔEQD2 includes ΔEQD_olt, the value of ΔEQD2 is equal to the value of ΔEQD_olt. Correspondingly, the foregoing formula (2) may be represented as:

$$EQD\_xgs2=EQD\_g2+EQD\_olt.$$

Optionally, if ΔEQD2 includes a plurality of items in ΔEQD_olt, ΔEQD_onu, and ΔEQD_fibre, the value of ΔEQD2 is equal to a sum of values of the plurality of items.

For example, it is assumed that ΔEQD2 includes ΔEQD_olt and ΔEQD_onu, the foregoing formula (2) may be represented as:

$$EQD\_xgs2=EQD\_g2+\Delta EQD\_olt+\Delta EQD\_onu.$$

In another example, it is assumed that ΔEQD2 includes ΔEQD_olt, ΔEQD_onu, and ΔEQD_fibre, the foregoing formula (2) may be represented as:

$$EQD\_xgs2=EQD\_g2+\Delta EQD\_olt+\Delta EQD\_onu+\Delta EQD\_fibre.$$

Optionally, in a factory commissioning phase of the ONU, the first channel and the second channel are separately online for testing, to obtain ΔEQD_onu based on a difference between test results. Further, ΔEQD_onu is hardcoded in an ONT software program as a software variable. Further, in this step, the ranging information corresponding to the second channel is determined based on a parameter included in ΔEQD. For example, it is assumed that ΔEQD includes only ΔEQD_onu, ΔEQD_onu may be directly added to EQD_g2 synchronized from the first channel, to obtain the ranging information corresponding to the second channel.

Further, after obtaining the ranging information corresponding to the second channel, the ONU may perform data transmission of a service with the OLT based on the ranging information and the obtained ONU ID. Optionally, the ONU may obtain an absolute sending time point of an upstream optical signal based on the ranging information corresponding to the second channel and an authorization relative time point indicated in bandwidth authorization information sent by the OLT in the running phase. Further, the ONU sends upstream service data on the second channel based on the absolute sending time point, and adds the ONU ID to the upstream service data.

It should be noted that the foregoing step S505 may alternatively be performed before the foregoing step S504. An execution sequence of S504 and S505 is not limited in this application.

S506: The OLT and the ONU perform authentication management through the first channel or the second channel.

This step is used to perform the authentication phase in the description corresponding to FIG. 2. In the authentication phase, the OLT interacts with the ONU to perform the authentication management.

In an optional implementation, the OLT and the ONU may perform authentication through the second channel.

The foregoing password authentication is used as an example. The OLT sends a PWD request message to the ONU through the second channel. The ONU feeds back a PWD response message to the OLT through the second channel, and adds password information in the message.

It should be noted that, for a case in which the internal structure of the ONU is the structure shown in FIG. 4, if the ONU implements the first channel before this step is performed, in this step, the ONU needs to first switch from implementing the first channel to implementing the second channel. In a specific implementation process, if an ONU side uses a time-division multiplexing mode, the ONU may use the structure shown in FIG. 4. For the structure shown in FIG. 4, optionally, the ONU may switch from the first channel to the second channel by using a changeover switch. For example, the changeover switch may have two values: "1" and "0". Before this step, the value of the changeover switch is "0", indicating that the ONU currently implements the first channel, that is, the PON MAC module of the ONU processes an electrical signal based on a delay corresponding to the first channel. In this step, the ONU switches the value of the changeover switch to "1". When the value of the changeover switch is "1", the PON MAC module of the ONU processes the electrical signal based on a delay corresponding to the second channel, so that the first channel is switched to the second channel.

In another optional implementation, the OLT and the ONU may perform the authentication through the first channel.

In this implementation, the OLT and the ONU still perform the authentication through the first channel.

The foregoing password authentication is used as an example. The OLT sends the PWD request message to the ONU through the first channel. The ONU feeds back the PWD response message to the OLT through the first channel, and adds the password information in the message.

It should be noted that, in the specific implementation process, if an authentication process in this step is performed through the first channel, this step may also be performed before the step S504 or S505, that is, the authentication may be first performed through the first channel, and then S504 or S505 is performed to synchronize the ONU ID and the ranging information.

Optionally, the OLT and the ONU may determine, in a pre-negotiation manner, to use the second channel or the first channel to perform the authentication, may preconfigure to use the second channel or the first channel to perform the authentication, or may fixedly use the second channel or the first channel to perform the authentication.

If the OLT and the ONU determine, in the pre-negotiation manner, to use the second channel or the first channel to perform the authentication, optionally, the OLT and the ONU may perform the negotiation through the extended PLOAM message or an extended OMCI message.

S507: The OLT and the ONU perform OMCI configuration recovery and OMCI management through the first channel or the second channel.

A process of this step may be considered as performing transmission configuration.

This step is used to perform the OMCI configuration recovery and the OMCI management in the running phase corresponding to the description in FIG. 2. After the running phase is entered, the OMCI configuration recovery and the OMCI management are first performed.

In an optional implementation, the OLT and the ONU may perform the OMCI configuration recovery and the OMCI management through the second channel.

It should be noted that, for a case in which the internal structure of the ONU is the structure shown in FIG. 4, if the ONU implements the first channel before this step is performed, in this step, the ONU needs to first switch from implementing the first channel to implementing the second channel. For a specific execution process, refer to the description in the step S505. Details are not described herein again.

In another optional implementation, the OLT and the ONU may perform the authentication through the first channel.

In this implementation, the OLT and the ONU still perform the OMCI configuration recovery and the OMCI management through the first channel.

It should be noted that, in the specific implementation process, if an authentication process in this step is performed through the first channel, this step may also be performed before the step S504 or S505, that is, the OMCI configuration recovery and the OMCI management may be first performed through the first channel, and then S504 or S505 is performed to synchronize the ONU ID and the ranging information.

Optionally, the OLT and the ONU may determine, in the pre-negotiation manner, to use the second channel or the first channel to perform the OMCI configuration recovery and the OMCI management, may preconfigure to use the second channel or the first channel to perform the OMCI configuration recovery and the OMCI management, or may also fixedly use the second channel or the first channel to perform the OMCI configuration recovery and the OMCI management.

If the OLT and the ONU determine, in the pre-negotiation manner, to use the second channel or the first channel to perform the OMCI configuration recovery and the OMCI management, optionally, the OLT and the ONU may perform the negotiation through the extended PLOAM message or the extended OMCI message.

S508: The OLT and the ONU perform service data exchange through the second channel or two channels.

That the OLT and the ONU perform the service data exchange through the two channels means that the OLT and the ONU perform the service data exchange through both the first channel and the second channel.

Specifically, in this step, the OLT and the ONU may perform the service data exchange in either of the following two manners.

1: The OLT and the ONU perform the service data exchange through the second channel.

In this manner, the OLT and the ONU perform the service data exchange through the second channel. To be specific, all upstream service data of the ONU is sent to the OLT through the second channel, and the OLT sends downstream service data to the ONU through the second channel.

Optionally, on an OLT side, after the ONU ID and the ranging information are synchronized through the foregoing steps S504 to S505, in this step, when the OLT sends downstream data to the ONU through the second channel in a downstream direction, the synchronized ONU ID may be added in a data packet corresponding to the downstream data. In an upstream direction, the OLT determines, on the second channel based on the synchronized ONU ID, an ONU that sends upstream data.

On the ONU side, after the ONU ID and the ranging information are synchronized through the foregoing steps S504 to S505, in this step, when the ONU sends the upstream data to the OLT through the second channel in the upstream direction, the synchronized ONU ID may be added in a data packet corresponding to the upstream data. In addition, an absolute sending time point of the upstream data may be determined based on the synchronized ranging information. In the downstream direction, the ONU can filter, on the second channel based on the synchronized ONU ID, the downstream broadcast message of the OLT.

2: The OLT and the ONU perform the service data exchange through the second channel and the first channel.

In this manner, the OLT and the ONU may perform the service data exchange through both the first channel and the second channel.

There may be a plurality of types of services exchanged between the OLT and the ONU, and each type has a different transmission delay requirement. Therefore, optionally, a transmission channel of a service may be determined based on a delay requirement of the service.

For example, service data whose service delay requirement is less than a preset threshold may be transmitted on the second channel, and service data whose service delay requirement is greater than the preset threshold may be transmitted on the first channel.

Optionally, before this step, the OLT may predetermine a mapping relationship between a service and a transmission channel, and notify the ONU of the mapping relationship between a service and a transmission channel. Further, in this step, when sending the downstream service data, the OLT may determine, according to the mapping relationship between the service and the transmission channel, to use the second channel or the first channel to transmit the downstream service data. When sending the downstream service data, the ONU may also determine, according to the mapping relationship between a service and a transmission channel, to use the second channel or the first channel to transmit the downstream service data.

Optionally, when determining the mapping relationship between a service and a transmission channel, the OLT may determine, based on whether the service delay requirement is greater than the preset threshold, the transmission channel corresponding to the service, or may directly obtain the mapping relationship between a service and a transmission channel based on manual configuration information.

It should be noted that, for a case in which the internal structure of the ONU is the structure shown in FIG. 4, if the ONU implements the first channel before this step is performed, in this step, the ONU needs to first switch from implementing the first channel to implementing the second channel. For the specific execution process, refer to the description in the step S505. Details are not described herein again.

In the foregoing method in this application, an SN obtaining process and a ranging process are performed through a first channel having a relatively large transmission delay, and service data that has a relatively high requirement for delay is transmitted through a second channel having a relatively small transmission delay. Therefore, a relatively large delay is no longer generated for the service data that has a relatively high requirement for delay. This further ensures normal execution of these services.

Figure 6:
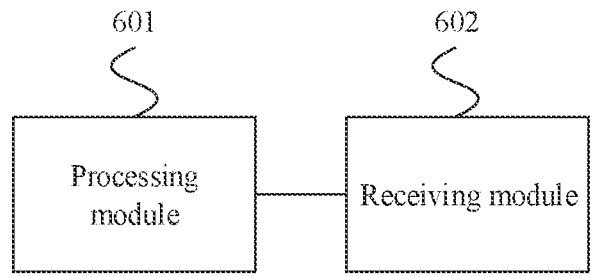
FIG. 6 is a structural diagram of modules of an information transmission apparatus according to an embodiment of this application.

FIG. 6 is a structural diagram of modules of an information transmission apparatus according to an embodiment of this application. The apparatus may be an OLT, or may be an apparatus that can support the OLT in implementing a function of the OLT in the method provided in the embodiments of this application. For example, the apparatus may be an apparatus in the OLT or a chip system. As shown in FIG. 6, the apparatus includes a processing module 601 and a receiving module 602.

The processing module 601 is configured to: allocate an identifier to a first ONU through a first channel, and perform, through the first channel, ranging on the first ONU to obtain ranging information about the first channel.

The receiving module 602 is configured to: after the OLT and the first ONU determine, through negotiation, to use two channels to perform information transmission, perform data transmission of a first service with the first ONU through a second channel.

Optionally, the processing module 601 is further configured to determine, through negotiation with the ONU, whether to use the two channels to perform the information transmission.

Optionally, the receiving module 602 is further configured to receive dual-channel support capability information sent by the ONU. The dual-channel support capability information includes a type of the first channel and a type of the second channel that are supported by the ONU.

The processing module 601 is further configured to determine, based on the dual-channel support capability information sent by the ONU and a dual-channel support capability of the OLT, whether to use the two channels to perform the information transmission.

Figure 7:
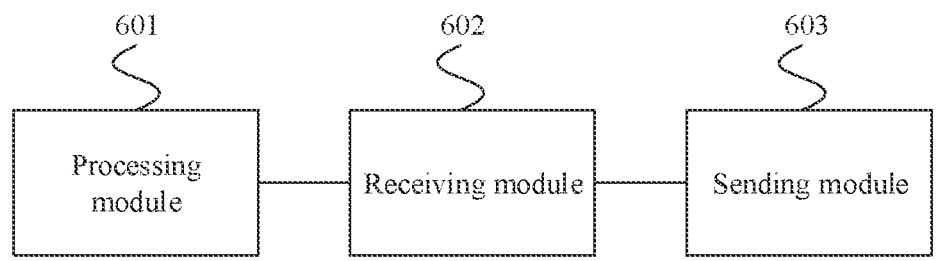
FIG. 7 is a structural diagram of modules of an information transmission apparatus according to an embodiment of this application.

FIG. 7 is a structural diagram of modules of an information transmission apparatus according to an embodiment of this application. As shown in FIG. 7, the foregoing apparatus further includes a sending module 603, configured to send dual-channel configuration information to the ONU. The dual-channel configuration information includes a type of the first channel and a type of the second channel that are selected by the OLT.

Optionally, the processing module 601 is further configured to determine ranging information about the second channel based on the ranging information about the first channel and a channel path delay difference.

The channel path delay difference includes at least one of a difference value between OLT circuit transmission delays, a difference value between ONU circuit transmission delays, and a difference value between optical path transmission delays caused by different wavelengths.

Optionally, the processing module 601 is further configured to perform the data transmission of the first service with the first ONU through the second channel based on the ranging information about the second channel and the identifier allocated to the first ONU.

Optionally, the receiving module 602 is further configured to perform data transmission of a second service with the first ONU through the first channel or the second channel.

Optionally, a delay of the first service is less than a preset delay, and a delay of the second service is greater than or equal to the preset delay.

Optionally, a transmission delay supported by the first channel is greater than a transmission delay supported by the second channel.

Figure 8:
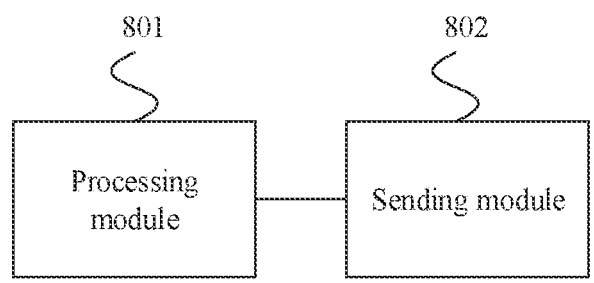
FIG. 8 is a structural diagram of modules of another information transmission apparatus according to an embodiment of this application.

Optionally, the processing module 601 is further configured to perform authentication management and transmission configuration on the first ONU through the first channel or the second channel, FIG. 8 is a structural diagram of modules of another information transmission apparatus according to an embodiment of this application. The apparatus may be an ONU, or may be an apparatus that can support the ONU in implementing a function of the ONU in the method provided in the embodiments of this application. For example, the apparatus may be an apparatus in the ONU or a chip system. As shown in FIG. 8, the apparatus includes a processing module 801 and a sending module 802.

The processing module 801 is configured to: obtain an identifier through a first channel, and perform, through the first channel, ranging to obtain ranging information about the first channel.

The sending module 802 is configured to: after the ONU and an OLT determine, through negotiation, to use two channels to perform information transmission, perform data transmission of a first service with the OLT through a second channel.

Optionally, the processing module 801 is further configured to determine, through negotiation with the OLT whether to use the two channels to perform the information transmission Optionally, the sending module 802 is further configured to send dual-channel support capability information to the OLT. The dual-channel support capability information includes a type of the first channel and a type of the second channel that are supported by the ONU.

Figure 9:
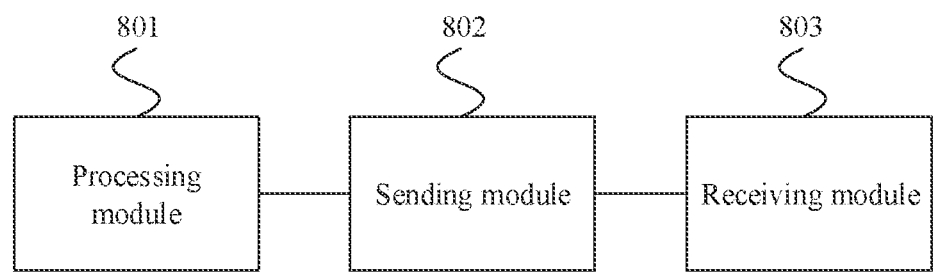
FIG. 9 is a structural diagram of modules of another information transmission apparatus according to an embodiment of this application.

FIG. 9 is a structural diagram of modules of another information transmission apparatus according to an embodiment of this application. As shown in FIG. 9, the foregoing apparatus further includes a receiving module 803, configured to receive dual-channel configuration information sent by the OLT. The dual-channel configuration information includes a type of the first channel and a type of the second channel that are selected by the OLT.

Optionally, the processing module 801 is further configured to determine ranging information about the second channel based on the ranging information about the first channel and a channel path delay difference.

The channel path delay difference includes at least one of a difference value between OLT circuit transmission delays, a difference value between ONU circuit transmission delays, and a difference value between optical path transmission delays caused by different wavelengths.

Optionally, the processing module 801 is further configured to perform the data transmission of the first service with the OLT through the second channel based on the ranging information about the second channel and the obtained identifier.

Optionally, the sending module 802 is further configured to perform data transmission of a second service with the OLT through the first channel or the second channel.

Optionally, a delay of the first service is less than a preset delay, and a delay of the second service is greater than or equal to the preset delay.

Optionally, a transmission delay supported by the first channel is greater than a transmission delay supported by the second channel.

In the embodiments of this application, division into modules is an example and is merely logical function division. In actual implementation, another division manner may be used. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 10:
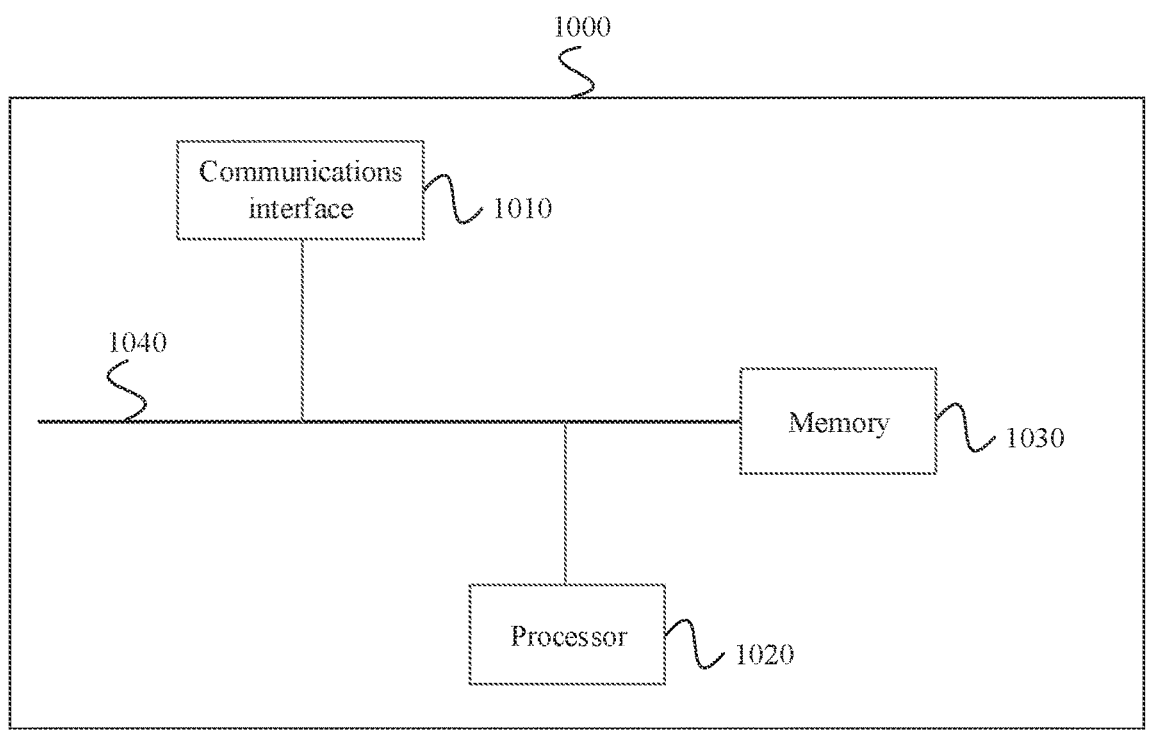
FIG. 10 is a physical block diagram of an OLT 1000 according to an embodiment of this application.

FIG. 10 shows an OLT 1000 according to an embodiment of this application. The OLT 1000 is configured to implement a function of the OLT in the foregoing method. The OLT 1000 includes at least one processor 1020, configured to implement a function of the OLT in the method provided in the embodiments of this application. For example, the processor 1020 may allocate an identifier to a first ONU through a first channel, and perform, through the first channel, ranging on the first ONU to obtain ranging information about the first channel. For details, refer to detailed descriptions in the method example. Details are not described herein again.

The OLT 1000 may further include at least one memory 1030, configured to store a program instruction and/or data. The memory 1030 is coupled to the processor 1020. Coupling in this embodiment of this application is an indirect coupling or a communication connection between apparatuses, units, or modules, may be in an electrical form, a mechanical form, or another form, and is used for information exchange between the apparatuses, the units, or the modules. The processor 1020 may operate with the memory 1030. The processor 1020 may execute the program instruction stored in the memory 1030. At least one of the at least one memory may be included in the processor.

The OLT 1000 may further include a communications interface 1010, configured to communicate with another device through a transmission medium, so that the communications interface 1010 is configured to communicate with an apparatus or another device in an ONU 2000. In the embodiments of this application, the communications interface may be an interface that can perform communication in any form, for example, a module, a circuit, a bus, or a combination thereof. Optionally, the communications interface 1010 may be a transceiver. The processor 1020 receives and sends data through the communications interface 1010, and is configured to implement the method performed by the OLT in the foregoing method embodiment.

In this embodiment of this application, a specific connection medium between the communications interface 1010, the processor 1020, and the memory 1030 is not limited. In this embodiment of this application, the memory 1030, the processor 1020, and the communications interface 1010 are connected through a bus 1040 in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

Figure 11:
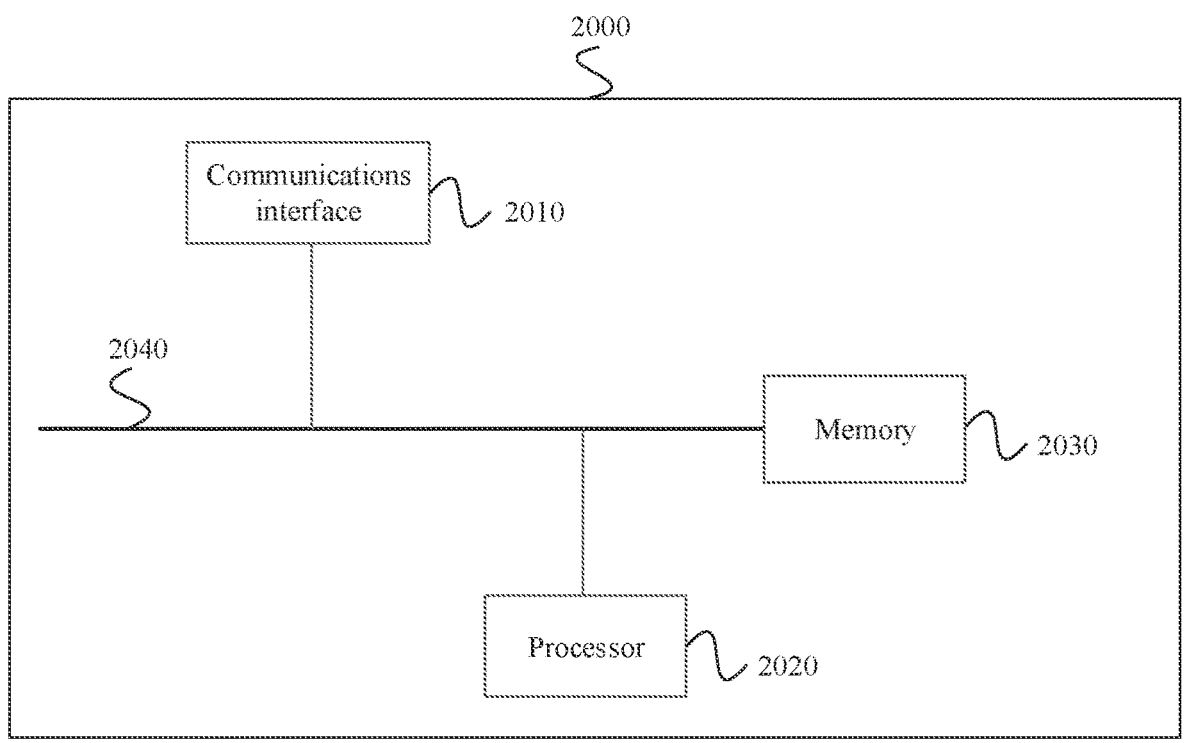
FIG. 11 is a physical block diagram of an ONU 2000 according to an embodiment of this application.

FIG. 11 shows an ONU 2000 according to an embodiment of this application. The ONU 2000 is configured to implement a function of the ONU in the foregoing method. The ONU 2000 includes at least one processor 2020, configured to implement a function of the ONU in the method provided in the embodiments of this application. For example, the processor 2020 may obtain an identifier through a first channel, and perform, through the first channel, ranging to obtain ranging information about the first channel. For details, refer to detailed descriptions in the method example. Details are not described herein again.

The ONU 2000 may further include at least one memory 2030, configured to store a program instruction and/or data. The memory 2030 is coupled to the processor 2020. Coupling in this embodiment of this application is an indirect coupling or a communication connection between apparatuses, units, or modules, may be in an electrical form, a mechanical form, or another form, and is used for information exchange between the apparatuses, the units, or the modules. The processor 2020 may operate with the memory 2030. The processor 2020 may execute the program instruction stored in the memory 2030. At least one of the at least one memory may be included in the processor.

The ONU 2000 may further include a communications interface 2010, configured to communicate with another device through a transmission medium, so that the communications interface 2010 is configured to communicate with an apparatus or another device in an OLT 1000. In the embodiments of this application, the communications interface may be an interface that can perform communication in any form, for example, a module, a circuit, a bus, or a combination thereof. Optionally, the communications interface 2010 may be a transceiver. The processor 2020 receives and sends data through the communications interface 2010, and is configured to implement the method performed by the ONU in the foregoing method embodiment.

In this embodiment of this application, a specific connection medium between the communications interface 2010, the processor 2020, and the memory 2030 is not limited. In this embodiment of this application, the memory 2030, the processor 2020, and the communications interface 2010 are connected through a bus 2040 in FIG. 11, and the bus is represented by a thick line in FIG. 11. A connection manner between other components is schematically described, and is not limited thereto. The bus may be classified into an address bus, a data bus, a control bus, and the like. For ease of representation, only one thick line is used to represent the bus in FIG. 11, but this does not mean that there is only one bus or only one type of bus.

In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by a combination of hardware in the processor and a software module.

In this embodiment of this application, the memory may be a non-volatile memory, for example, a hard disk drive (HDD) or solid-state drive (SSD); or may be a volatile memory, for example, a random access memory (RAM). The memory is any other medium that can be used to carry or store expected program code in a form of an instruction or a data structure and that can be accessed by a computer, but is not limited thereto. The memory in the embodiments of this application may alternatively be a circuit or any other apparatus that can implement a storage function, and is configured to store the program instruction and/or the data.

All or some of the foregoing methods in the embodiments of this application may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to the embodiments of the present invention are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An information transmission method, applied to an optical line termination (OLT), wherein the method comprises:
    allocating, by the OLT, an identifier to a first optical network unit (ONU) through a first channel, and performing, through the first channel, ranging on the first ONU to obtain ranging information about the first channel; and
    after determining, by the OLT and the first ONU through negotiation, to use two channels to perform information transmission:
    determining, by the OLT, ranging information about a second channel based on the ranging information about the first channel and a channel path delay difference, wherein the channel path delay difference comprises at least one of a difference value between OLT circuit transmission delays, a difference value between ONU circuit transmission delays, or a difference value between optical path transmission delays caused by different wavelengths; and
    performing, by the OLT, data transmission of a first service with the first ONU through the second channel.

2. The method according to claim 1, wherein before the performing, by the OLT, data transmission of a first service with the first ONU through a second channel, the method further comprises:
    determining, by the OLT and the first ONU through negotiation, whether to use the two channels to perform the information transmission.

3. The method according to claim 2, wherein the determining, by the OLT and the first ONU through negotiation, whether to use the two channels to perform the information transmission comprises:
    receiving, by the OLT, dual-channel support capability information sent by the first ONU, wherein the dual-channel support capability information comprises a type of the first channel and a type of the second channel that are supported by the first ONU; and
    determining, by the OLT based on the dual-channel support capability information sent by the first ONU and a dual-channel support capability of the OLT, whether to use the two channels to perform the information transmission.

4. The method according to claim 2, wherein after the determining, by the OLT and the first ONU through negotiation, to use two channels to perform information transmission, the method further comprises:
    sending, by the OLT, dual-channel configuration information to the first ONU, wherein the dual-channel configuration information comprises a type of the first channel and a type of the second channel that are selected by the OLT.

5. The method according to claim 1, wherein the performing, by the OLT, data transmission of a first service with the first ONU through a second channel comprises:
    performing, by the OLT, the data transmission of the first service with the first ONU through the second channel based on the ranging information about the second channel and the identifier allocated to the first ONU.

6. The method according to claim 1, wherein the method further comprises:
    performing, by the OLT, data transmission of a second service with the first ONU through the first channel or the second channel.

7. An information transmission method, applied to an optical network unit (ONU), wherein the method comprises:
    obtaining, by the ONU, an identifier through a first channel, and performing, through the first channel, ranging to obtain ranging information about the first channel; and
    after determining, by the ONU and an optical line termination (OLT) through negotiation, to use two channels to perform information transmission:
    determining, by the ONU, ranging information about a second channel based on the ranging information about the first channel and a channel path delay difference, wherein the channel path delay difference comprises at least one of a difference value between OLT circuit transmission delays, a difference value between ONU circuit transmission delays, and a difference value between optical path transmission delays caused by different wavelengths; and
    performing, by the ONU, data transmission of a first service with the OLT through the second channel.

8. The method according to claim 7, wherein before the performing, by the ONU, data transmission of a first service with the OLT through a second channel, the method further comprises:
    determining, by the ONU and the OLT through negotiation, whether to use the two channels to perform the information transmission.

9. The method according to claim 8, wherein the determining, by the ONU and the OLT through negotiation, whether to use the two channels to perform the information transmission comprises:
    sending, by the ONU, dual-channel support capability information to the OLT, wherein the dual-channel support capability information comprises a type of the first channel and a type of the second channel that are supported by the ONU; and
    receiving, by the ONU, dual-channel configuration information sent by the OLT, wherein the dual-channel configuration information comprises a type of the first channel and a type of the second channel that are selected by the OLT.

10. The method according to claim 7, wherein the performing, by the ONU, data transmission of a first service with the OLT through a second channel comprises:
    performing, by the ONU, the data transmission of the first service with the OLT through the second channel based on the ranging information about the second channel and the obtained identifier.

11. The method according to claim 7, wherein the method further comprises:

performing, by the ONU, data transmission of a second service with the OLT through the first channel or the second channel.

12. An optical line termination (OLT), wherein the OLT comprises:

at least one processor; and one or more memories coupled to the at least one processor and storing programming instructions for execution by the at least one processor to perform operations comprising:

allocating an identifier to a first optical network unit (ONU) through a first channel, and performing, through the first channel, ranging on the first ONU to obtain ranging information about the first channel; and after determining, through negotiation with the ONU, to use two channels to perform information transmission:

determining ranging information about a second channel based on the ranging information about the first channel and a channel path delay difference, wherein the channel path delay difference comprises at least one of a difference value between OLT circuit transmission delays, a difference value between ONU circuit transmission delays, or a difference value between optical path transmission delays caused by different wavelengths; and performing data transmission of a first service with the first ONU through the second channel.

13. The OLT according to claim 12, wherein the operations further comprise:

determining, through negotiation with the ONU, whether to use the two channels to perform the information transmission.

14. The OLT according to claim 13, wherein the operations further comprise:

receiving dual-channel support capability information sent by the first ONU, wherein the dual-channel support capability information comprises a type of the first channel and a type of the second channel that are supported by the first ONU; and determining, based on the dual-channel support capability information sent by the first ONU and a dual-channel support capability of the OLT, whether to use the two channels to perform the information transmission.

15. The OLT according to claim 13, wherein the operations further comprise:

sending dual-channel configuration information to the first ONU, wherein the dual-channel configuration information comprises a type of the first channel and a type of the second channel that are selected by the OLT.

16. The OLT according to claim 12, wherein the operations further comprise:

performing data transmission of a second service with the first ONU through the first channel or the second channel.

17. An optical network unit (ONU), wherein the ONU comprises:

at least one processor; and one or more memories coupled to the at least one processor and storing programming instructions for execution by the at least one processor to perform operations comprising:

obtaining an identifier through a first channel, and performing, through the first channel, ranging to obtain ranging information about the first channel; and after determining, through negotiation with an optical line termination (OLT), to use two channels to perform information transmission:

determining ranging information about a second channel based on the ranging information about the first channel and a channel path delay difference, wherein the channel path delay difference comprises at least one of a difference value between OLT circuit transmission delays, a difference value between ONU circuit transmission delays, and a difference value between optical path transmission delays caused by different wavelengths; and performing data transmission of a first service with the OLT through the second channel.

18. The ONU according to claim 17, wherein the operations further comprise:

determining, through negotiation with the OLT, whether to use the two channels to perform the information transmission.

19. The ONU according to claim 18, wherein the operations further comprise:

sending dual-channel support capability information to the OLT, wherein the dual-channel support capability information comprises a type of the first channel and a type of the second channel that are supported by the ONU; and receiving dual-channel configuration information sent by the OLT, wherein the dual-channel configuration information comprises a type of the first channel and a type of the second channel that are selected by the OLT.

20. The ONU according to claim 17, wherein the operations further comprise:

performing data transmission of a second service with the OLT through the first channel or the second channel.

* * * * *

UNITED STATES PATENT AND TRADEMARK OFFICE
CERTIFICATE OF CORRECTION

| | |
|---|---|
| PATENT NO. | : 11,405,109 B2 |
| APPLICATION NO. | : 17/186751 |
| DATED | : August 2, 2022 |
| INVENTOR(S) | : Lun Zhang and Gang Zheng |

It is certified that error appears in the above-identified patent and that said Letters Patent is hereby corrected as shown below:

In the Specification

In Column 1, Line 11 (Approx.), delete "Which" and insert -- which --.

Signed and Sealed this
Fourth Day of April, 2023

Katherine Kelly Vidal
*Director of the United States Patent and Trademark Office*